April 19, 1932. M. R. ANSTICE 1,855,085
COVER FOR VEGETABLE PEELING MACHINES
Filed Feb. 20, 1930 2 Sheets-Sheet 2
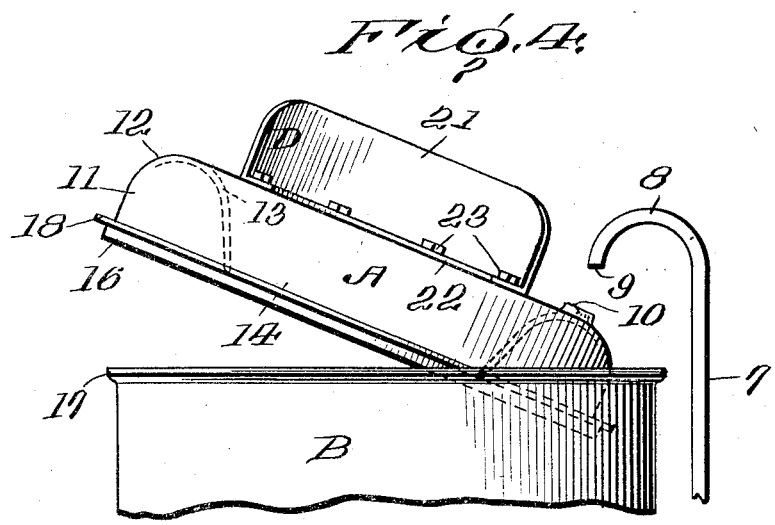
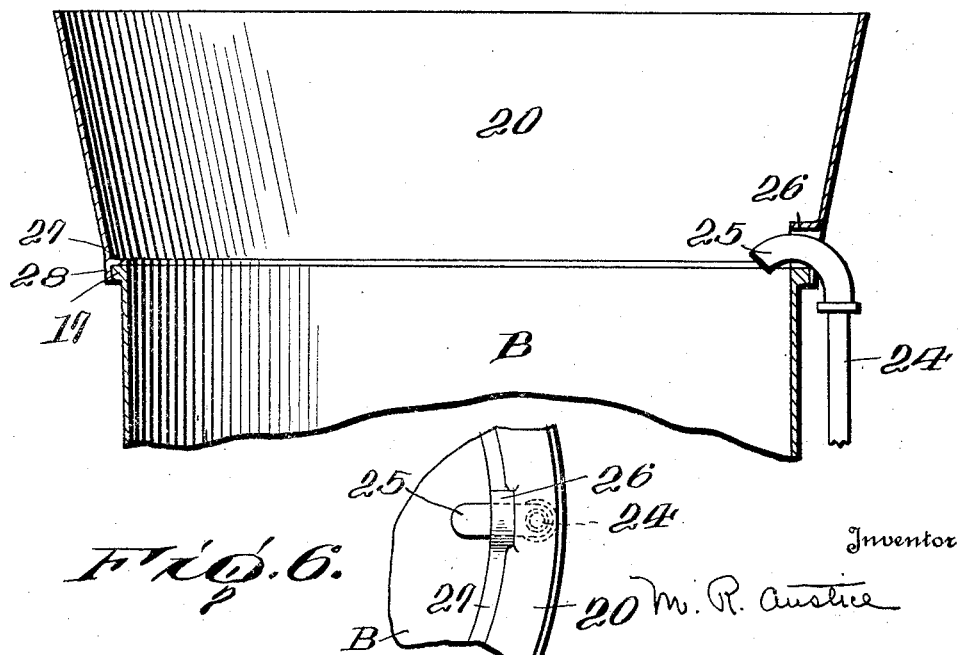

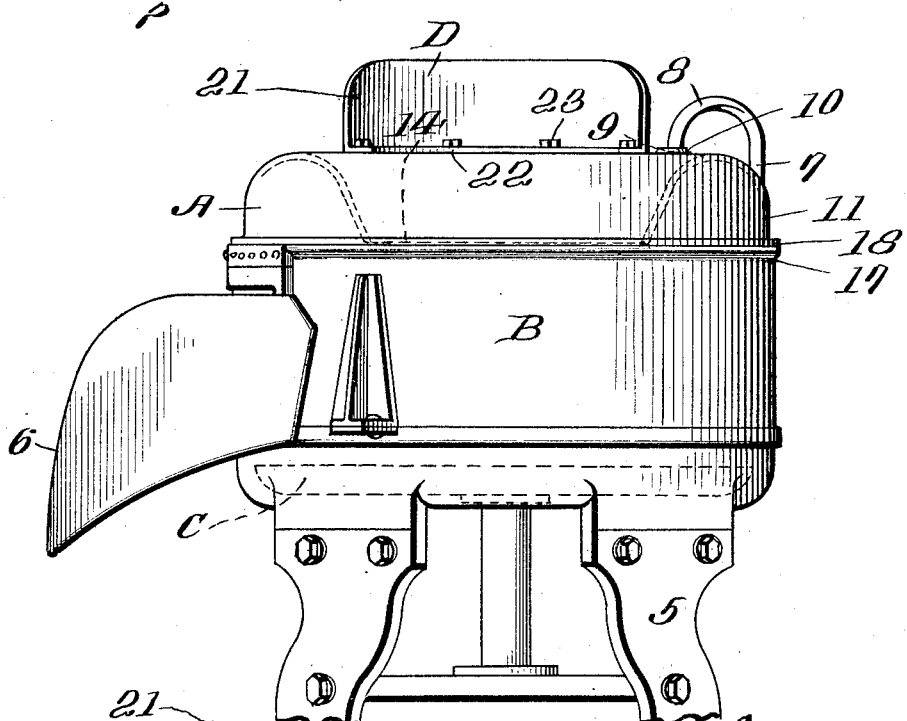

Patented Apr. 19, 1932

1,855,085

UNITED STATES PATENT OFFICE

MORTIMER R. ANSTICE, OF ROCHESTER, NEW YORK, ASSIGNOR TO JOSIAH ANSTICE & CO., INC., OF ROCHESTER, NEW YORK

COVER FOR VEGETABLE PEELING MACHINES

Application filed February 20, 1930. Serial No. 430,085.

This invention relates to improvements in covers for vegetable peeling machines.

One of the objects of the invention is the provision of a one piece cover which may be lifted readily from the machine.

Another object of the invention is the provision of an improved cover through which the water supply for the machine passes, yet is of a construction permitting ready and easy disconnection between the cover and the water supply pipe and easy removal of the cover from the machine.

A still further object of the invention is the provision of a cover so designed and constructed as to prevent the passage outwardly of the vegetables being peeled and to act as a guide for the return of the vegetables in the proper path.

Other objects, novel features of construction and improved results of the cover will appear from the following description and accompanying drawings.

In the drawings:

Figure 1 is a view in side elevation of the machine having the improved cover applied thereto.

Fig. 2 is a transverse vertical sectional view of the cover.

Fig. 3 is a partial top plan view.

Fig. 4 is a detailed view in side elevation illustrating the manner of disconnecting the cover from the water supply pipe and removing it from the machine.

Fig. 5 is a transverse vertical sectional view illustrating a feed hopper applied to the cover.

Fig. 6 is a partial top view of the modification shown in Fig. 5.

The present cover forming this invention is designated by A, and is intended for use upon a peeling machine composed of a cylindrical housing or chamber B, in which the vegetables are placed to be peeled. In the bottom of this vegetable receiving and peeling chamber is rotatably mounted a peeler disc C, which can be removed from the chamber by lifting it vertically therefrom.

The peeling and vegetable receiving chamber is supported by suitable legs 5 and is provided with a discharge chute 6.

In machines of this character wash water is supplied during the peeling operation and in the particular construction illustrated is a suitable supply pipe 7, which extends upwardly above the machine and is curved or bent downwardly as at 8, so that its end 9 is positioned within the tapered opening 10 provided in the cover. The dimensions of the cover and pipe are such that the end 9 of the water pipe does not go through the cover, so that any part of it extends beneath the inner face of the cover, but ends flush with the under side of the cover so that when potatoes or other vegetables strike the under side of the cover they will not be gouged by a protruding pipe end.

As the vegetable receiving and peeling chamber is circular in shape, the cover A is likewise circular in shape and comprises a vertical wall 11, which, at its top, is curved inwardly as at 12, and then downwardly and inwardly as indicated at 13, to provide a curved lip immediately above the peeling chamber.

Although A is termed a cover, it does not completely close the upper end of the peeling chamber, as a central opening 14 is provided in the cover, the confines of which are determined by the edge 15 of the curved lip 13.

The cover is preferably cast in one piece from metal and is of a diameter slightly less than the diameter of the peeling chamber, so that the lower edge 16 of the vertical cover wall extends into the upper end of the peeling chamber when the cover is placed in position and is supported upon the upper flared edge 17 of the peeling chamber by a circumferential flange 18 formed on the outer face of the vertical wall 11, at a point slightly above the lower edge 16 thereof.

The curved lip of this cover is of material aid in preventing the vegetables from jumping out of the top of the peeler chamber when the machine is in operation. When the machine is in operation the vegetables are agitated to form a vortex, and it will be seen that the curved lip of the cover will act as a guide for returning those vegetables which may happen to strike it to the center of the vortex during the peeling operation.

The cover is held against displacement by reason of the flange 18 and the flange formed by the lower end 16 of the vertical cover wall. The cover is readily and quickly removable by placing the hands through the opening 14 and placing the fingers up under the curved lip 13. An attempt has been made to illustrate the method of removing the cover from the machine in Figure 4 of the drawings. In removing the cover the part opposite the water connection is lifted up and pulled slightly forward which permits the part of the cover immediately below the water pipe to drop down. This downward movement of the cover disconnects the cover from the water pipe and the cover can be completely removed from the peeling chamber and carried away.

The removal of the cover from the peeling machine is occasionally necessary in order to permit the removal of the peeling disc from the peeling chamber.

In some constructions heretofore known, covers of machines of this type have been made in two pieces, one of which has been hinged so that it could be lifted up. Other constructions are known in which the whole cover has been hinged, but with both of these constructions serious accidents have resulted through the lifted cover dropping down upon the hands of the operator, and as these covers weigh up to as much as forty pounds, the accidents in some cases have been of a serious nature.

The mashing or injury to the operator's fingers in the removal of the cover of this invention is absolutely guarded against, because the operator's fingers are inside of the cover and up under the curved lips where they cannot be mashed or injured in any way.

This cover has another advantage, in that an extension hopper is unnecessary and, consequently, the machine can be loaded from either side, the front or even back of the machine by merely dumping the vegetables through the opening 14. In most of the machines known to applicant, they are so arranged that they have to be loaded from the front which is inconvenient, because it is at this point that the discharge or hopper 6 is located and it is, consequently, difficult to stand close to the machine when loading it.

In Figures 1 to 4 of the drawings, there is illustrated in connection with the cover A, a guard D, which is semi-circular in form and comprises a vertical wall 21, which at its bottom has an inwardly extending flange 22, by means of which it is bolted to the cover adjacent the central opening therein by means of bolts 23. The use of this guard is more-or-less optional and it is for the purpose of preventing the vegetables rolling off of the cover when the machine is being loaded by a large measurer, such as a bushel basket or a shovel.

The guard does not have to be positioned exactly as shown, as it can be placed in most any position about the circumference of the cover top and it can be of a length greater or less than that illustrated as may be desired.

In Fig. 5 of the drawings, the feed hopper is illustrated, which is sometimes furnished when the peeling mechanisms are sold to canners, to enable them to shovel the vegetables more readily and quickly into the peeling chamber of the machine. This hopper is of a height in respect to the depth of the peeling cylinder of the machine such as to prevent any of the vegetables jumping out through the top of the hopper.

When the modified form of the invention, appearing in Fig. 5, is used, the wash-water is admitted over the top edge of the peeling cylinder of the machine, through a pipe 24 which has a downwardly and inwardly bent discharge end 25. The hopper 20, adjacent its lower edge, is provided with an open faced semi-circular shaped depression or groove 26, which accommodates and surrounds the pipe discharge end 25. Due to the groove or depression having an open face the hopper 20 can be lifted vertically from the peeling cylinder whenever it is necessary, as the cover is supported on the upper end portion 17 of the peeling cylinder upon the inwardly extending circumferential flange 27 formed interially of the hopper slightly above its lower end 28. The hopper is of a diameter slightly greater than the diameter of the upper end of the peeling cylinder with the result that the ends 28 of the hopper wall parallel the outer face of the shoulder 17, at the upper end of the peeling chamber. From the foregoing, it will be seen that the hopper support is such as to prevent any accidental displacement of the hopper, yet at the same time the hopper can be easily lifted from the peeling chamber of the machine.

Having thus described my invention, what I claim and desire to secure by Letters Patent is:

1. A cover for the vegetable receiving and peeling chamber of a peeling machine in which chamber is mounted a peeling disc, the lower edge of said cover adapted to fit within the upper end of said chamber, means extending outwardly from the cover adjacent its lower edge for loosely supporting the cover upon the upper edge of the chamber, a wash water supply pipe for said chamber extending over said cover and having a downwardly extending end, an opening in said cover for loosely receiving the extending end of said supply pipe, a central opening in said cover acting as a vegetable feed hopper and said cover removable from said chamber only by lifting that portion of the cover remote to the water supply pipe to cause the cover portion immediately below the water supply pipe to lower and break the loose connection between the cover and the supply pipe.

2. In a vegetable peeling machine having a vegetable receiving and peeling chamber provided with a peeling disc and an overhead water supply pipe, a cover for said machine having a central opening defined by a downwardly and inwardly extending circular edge forming a lip, said cover further provided with a centrally arranged opening adapted to loosely receive the downwardly extending end of a water supply pipe, the lower outer edge of said cover adapted to fit within the upper end of the machine chamber and provided adjacent its lower edge with an outwardly extending flange adapted to rest upon the upper end of the machine chamber for supporting the cover in place, and said cover detachable from said water supply pipe and removable from the machine only by lifting that part of the cover remote to the water connection and then sliding and lifting the cover from beneath the water supply pipe and from the end of the chamber.

3. A vegetable peeling machine having an open ended vegetable receiving and peeling chamber, a cover for said chamber loosely supported upon the upper end thereof, a wash-water supply for said chamber comprising a pipe extending over said cover and having a downwardly extending end, an opening in said cover positioned a substantial distance inwardly from the edge of the cover for loosely receiving the end of said water-supply pipe to permit the passage of water into the peeling chamber, and said cover removable from said chamber only by lifting that portion of the cover remote to the water-supply pipe to cause the cover portion immediately below the water-supply to lower and break the connection between the cover and the supply pipe.

In testimony whereof I hereunto affix my signature.

MORTIMER R. ANSTICE.